(12) United States Patent
Vosters

(10) Patent No.: US 9,598,619 B2
(45) Date of Patent: Mar. 21, 2017

(54) DUAL ACTION ADHESIVE COMPOSITION

(71) Applicant: BOSTIK SA, La Plaine Saint Denis (FR)

(72) Inventor: Petrus Johannes Cornelius Vosters, Haaren (NL)

(73) Assignee: BOSTIK SA, La Plaine Saint Denis (FR)

( * ) Notice: Subject to any disclaimer, the term of this patent is extended or adjusted under 35 U.S.C. 154(b) by 0 days.

(21) Appl. No.: 14/424,807

(22) PCT Filed: Aug. 30, 2013

(86) PCT No.: PCT/EP2013/068020
§ 371 (c)(1),
(2) Date: Feb. 27, 2015

(87) PCT Pub. No.: WO2014/033273
PCT Pub. Date: Mar. 6, 2014

(65) Prior Publication Data
US 2015/0210908 A1 Jul. 30, 2015

(30) Foreign Application Priority Data

Aug. 31, 2012 (NL) ..................................... 2009399
Nov. 20, 2012 (NL) ..................................... 2009848

(51) Int. Cl.
| | | |
|---|---|---|
| C09J 171/00 | (2006.01) | |
| C09J 171/02 | (2006.01) | |
| C08K 3/34 | (2006.01) | |
| C08G 65/336 | (2006.01) | |
| C09J 201/10 | (2006.01) | |

(52) U.S. Cl.
CPC .......... *C09J 171/00* (2013.01); *C08G 65/336* (2013.01); *C08K 3/346* (2013.01); *C09J 171/02* (2013.01); *C09J 201/10* (2013.01)

(58) Field of Classification Search
None
See application file for complete search history.

(56) References Cited

U.S. PATENT DOCUMENTS

| | | | | |
|---|---|---|---|---|
| 9,181,454 B2* | 11/2015 | Brooks | ................... | C08G 18/48 |
| 2003/0162877 A1* | 8/2003 | Chaiko | ..................... | C08K 9/08 |
| | | | | 524/445 |
| 2005/0096422 A1* | 5/2005 | Torkelson | ............... | B29B 7/007 |
| | | | | 524/445 |
| 2005/0261412 A1* | 11/2005 | Bandou | ................ | C08G 65/336 |
| | | | | 524/442 |
| 2007/0179236 A1 | 8/2007 | Landon | | |
| 2007/0255005 A1* | 11/2007 | Masaoka | ............... | C08G 65/336 |
| | | | | 524/858 |
| 2012/0042499 A1* | 2/2012 | Van Beers | ............. | C09J 123/10 |
| | | | | 29/458 |
| 2012/0107626 A1* | 5/2012 | Schindler | ............. | C08G 65/336 |
| | | | | 428/447 |
| 2012/0225983 A1* | 9/2012 | Wagner | .................... | C09J 11/06 |
| | | | | 524/296 |

FOREIGN PATENT DOCUMENTS

| | | |
|---|---|---|
| CN | 10140339 A | 4/2009 |
| EP | 0819749 A2 | 1/1998 |

OTHER PUBLICATIONS

International Search Report for PCT/EP2013/068020 dated Feb. 26, 2014.
Fang Ying-guang and Gu Ren-guo; "Experiment Study on the Effects of Adsorbed Water on Rheological Characteristics of Soft Clayey Soil", Science Technology and Engineering, vol. 7, 2007, 73-78.
Office Action in corresponding CN Application No. 201380054868.3 dated Aug. 24, 2016.
Office Action in corresponding AU Application No. 2013310878 dated Oct. 4, 2016.
Philippe Cognard, "Adhesives and Sealants, Basic Concepts and High Tech Bonding, Handbook of Adhesives and Sealants, vol. 1;" Chapter 5 (John Bishopp) 262-264 Published 2005, Elsevier B.V. Netherlands.
Philippe Cognard, "Adhesives and Sealants, General Knowledge, Application Techniques, New Curing Techniques, Handbook of Adhesives and Sealants, vol. 2;" pp. 60, 71-74 and 155; Published 2006, Elsevier B.V. Netherlands.

* cited by examiner

*Primary Examiner* — Marc Zimmer
(74) *Attorney, Agent, or Firm* — Millen, White, Zelano and Branigan, P.C.

(57) ABSTRACT

The present invention relates to an one-component adhesive composition, comprising a moisture cross-linking silyl modified polymer and an organoclay-based rheology controller being an alkyl ammonium salt modified mineral clay mixture. The present invention relates moreover to a two-component adhesive composition, comprising a first component A) comprising a moisture cross-linking polymer and an organoclay-based rheology controller; and a second water-based component B) that is reactive with component A) upon mixing thereof. The present invention moreover relates to a method of production of said adhesive composition.

17 Claims, No Drawings

DUAL ACTION ADHESIVE COMPOSITION

The present invention relates to a mono- and a two-component adhesive composition, a kit of parts comprising said two-component adhesive composition, a method of preparing said adhesive composition, and an adhesive composition usable for activation by moisture, as well as a two-component dual action adhesive.

BACKGROUND

In industry and also in household environment materials that are alike or different to each other, e.g. metallic and/or non-metallic substrates, are joined together using adhesives or sealants. Various one-component and two-component adhesives are known. Both one-component (1K) and two-component (2K) adhesives are known that cure at room temperature (23° C.), so called 1K-RTV or 2K-RTV (Room Temperature Vulcanizing) adhesives. Adhesives that cure at higher or lower temperatures are also known. Two-component compositions comprise at least two-components; each component containing materials that react with materials in the other component to form a cured resin. Both components are generally able to flow so that they can be readily mixed.

There are several types of two-component adhesive systems known, e.g. systems based on polyurethane or epoxy resins or based on moisture cross-linking polymers. The present invention is related to the latter, namely moisture cross-linking polymers.

One of the components of two-component moisture cross-linking adhesive systems contains a substantially water free polymer or resin that cures with the aid of moisture (i.e. water) and optionally a cross-linking catalyst. The other component comprises moisture (for example in the form of water). Upon combination of the moisture cross-linking polymer and said moisture a cross-linking reaction takes place to form said adhesive. As the presence of moisture (e.g. water) would result in curing of the adhesive, an one-component adhesive comprising a moisture cross-linking adhesive is free of an effective amount of water (i.e. usually less than 0.5 w/w % (wt. %)). Curing takes place after application of the said 1K adhesive upon contact with the moisture of the air.

Both one- and two-component adhesive systems generally comprise rheology controllers, for 2K systems in either or both of the components. The adhesive or sealant must show different rheology characteristics at different times. At the time of application, good flow characteristics are required whereas directly after application high viscous behavior is required to achieve its high tack function. Thus the rheology characteristics of the adhesive composition need to be controlled in a very precise manner.

These rheology controllers increase the viscosity of the adhesive and thereby provide so-called early strength, meaning the strength directly after application of the adhesive and prior to the cross-linking and/or curing of the adhesive. Thus, rheology controllers are used to provide sufficient tackiness of the adhesive composition in the period directly following the application of the adhesive until the cross-linking has proceeded sufficiently. If, for example, the adhesive is used to fasten a plate on a vertical surface, the plate should be kept in position for the period of time it takes for the polymer to cross-link without falling down or sliding down.

A disadvantage of insufficient early strength is that the parts to be joined together have to be mechanically (or manually) fixed in position until the bond has developed sufficient strength, which is undesirable.

Another disadvantage of known one- and two-component adhesives is that the rheology controller increases the viscosity to such extent that application of the adhesive is impaired. For 2K adhesives, the rheology controller added to either or both of the components increases the viscosity to such an extent that the mixing of i) a relatively viscous component with a relatively liquid (less viscous) component or ii) two relatively viscous components is difficult. There is insufficient compatibility between the two components to achieve homogenous mixing in an easy way. A thorough mixing is required in order to get efficient and quick activation of the moisture cross-linking polymer. Specialized equipment is required for homogeneous mixing of the two-components, which is not advantageous.

It is therefore an aim of the present invention to provide both an one- and a two-component adhesive composition that solves one or more of the above problems of prior art adhesives.

SUMMARY

The present invention, relates to an adhesive composition, usable for activation by moisture, said adhesive composition comprising a moisture cross-linking polymer selected from the group consisting of silyl modified polymers (SMP), preferably from the group consisting of Modified Silyl (MS-) polymers or silyl-terminated polymers and an inactivated organoclay-based rheology controller being an alkyl ammonium salt-modified mineral clay mixture and having a water content of less than 0.5 w/w. %.

In a first aspect the present invention relates to a one-compound adhesive composition.

The present invention, in a second aspect, relates to a two-component adhesive composition, comprising: a component A) based on a moisture cross-linking polymer selected from the group consisting of silyl modified polymers (SMP), preferably from the group consisting of Modified Silyl (MS-) polymers or silyl-terminated polymers and comprising an organoclay-based rheology controller being an alkyl ammonium salt-modified mineral clay mixture (which controller is preferably inactivated); and a component B) comprising water.

In the following paragraphs embodiments of first and/or second aspects of the invention are discussed.

In an embodiment, component A) comprises water in an amount that is equal to or less than 0.5 w/w. %, preferably 0.3 w/w. % or less, more preferably 0.1 w/w. % or less, based on the weight of the component A).

In another embodiment, the rheology controller comprises water in an amount that is equal to or less than 0.5 w/w. %, preferably 0.3 w/w. % or less, more preferably 0.1 w/w. % or less, based on the weight of said rheology controller.

Thus, the rheology controller is an alkyl ammonium salt-modified mineral clay mixture (i.e. a mineral clay mixture or blend that has been modified using alkyl ammonium salt).

In yet another embodiment, the rheology controller is present in inactivated form. This inactivated form can be reactivated either by moisture (e.g. water) from the surrounding air in the case of a 1K system or by component B) in the case of a 2K system. In a 2K system additional activation can take place by ambient moisture, in addition to said component B).

In yet another embodiment, the 1K composition or component A) of a 2K system has a dynamic viscosity of between 20,000 and 40,000 Pas (preferably between 22,000 and 35,000, most preferably between 22,000 and 32,000) as measured at 23° C. at a shear rate of 0.1 sec$^{-1}$ and/or a dynamic viscosity of between 3500 and 4500 Pas (preferably between 3750 and 4250) as measured at 23° C. at a shear rate of 1.0 sec$^{-1}$ and/or a dynamic viscosity of between 800 and 1200 Pas (preferably between 900 and 1100 Pas, more preferably between 1000 and 1100 Pas) as measured at 23° C. at a shear rate of 5.0 sec$^{-1}$.

In yet another embodiment, the component B) of a 2K system has a dynamic viscosity of between 2000 and 3500 Pas as measured at 23° C. at a shear rate of 0.1 sec$^{-1}$ and/or a dynamic viscosity of between 100 and 300 Pas as measured at 23° C. at a shear rate of 5.0 sec$^{-1}$.

In yet another embodiment, the ratio of component A) to component B) of a 2K system is between 1:25 and 100:1, preferably between 10:1 and 60:1, more preferably between 30:1 and 50:1. In other words for each part by weight of component B) between 1 and 100 parts by weight of component A) is added, preferably between 10 and 60 parts by weight of component A), more preferably between 30 and 50 parts by weight of the 1K composition or of component A) of the 2K composition.

It is also possible to calculate the ratio of component A) to component B) by means of parts per volume. Since the specific gravity of the components are known to a person skilled in the field, the values for the ratios based on weight mentioned above can be recalculated to ratios based on volume.

In another aspect, the present invention relates to kit of parts comprising two containers, optionally compression means and optionally a static mixing head, wherein said two containers each contain a component of a two-component adhesive composition: a first container comprising component A) based on a moisture cross-linking polymer and comprising an organoclay-based rheology controller; and a second container comprising component B) comprising water.

In another aspect, the present invention relates to a method of preparation of an adhesive composition by either exposing a one-component composition to air or by combining two-components A) and B) of a two-component adhesive composition according to the present invention, wherein said moisture cross-linking polymer is cross-linked and/or cured by the addition of component B) to component A) and wherein said rheology controller present in component A) is reactivated by said component B).

In an embodiment, the early strength of the 1K adhesive composition directly after release from its container or of the 2K adhesive composition upon mixing of components A) and B) immediately after the substrates to be joined have been fitted together of at least 80 N/2000 mm$^2$, for example between 80 and 120 N/2000 mm$^2$, preferably between 90 and 120 N/2000 mm$^2$ as measured as disclosed below in Method of measuring early strength.

In a further aspect, the invention relates to an one-component dual action adhesive composition based on a moisture cross-linking polymer and further comprising an organoclay-based rheology controller; said composition showing dual action upon contact with moisture, being physical action by means of reactivation of said rheology controller and chemical action by cross-linking and/or curing of said moisture cross-linking polymer. The action of the ambient moisture takes place starting at the outside of the adhesive composition, in other words at the boundary of the adhesive composition and the surrounding air. An elastic skin will form on the outside of the adhesive composition due to both the increased viscosity due to reactivation of the organoclay-based rheology controller as well as due to the curing of the moisture curing polymer. The elasticity of the skin is most likely caused by the cross-linked structure, although the present inventors do not whish to be bound by a particular theory; simultaneously or even earlier to this occurrence of elasticity more toughness or stiffness seems to occur at the surface due to increased viscosity. The present inventors have found that the deactivated organoclay-based rheology controller is very susceptible to water. It is hygroscopic and will attract water. This will increase the speed of attracting of water and hence the speed of curing.

In another aspect, the invention relates a two-component dual action adhesive composition based on two separate components A) and B), component A) being based on a moisture cross-linking polymer and further comprising an organoclay-based rheology controller; and component B) comprising water; said first component A) showing dual action upon addition of component B), being physical action by means of reactivation of said rheology controller and chemical action by cross-linking and/or curing of said moisture cross-linking polymer.

The preferred embodiments cited for the first and second aspects of the invention are also applicable for all of the other aspects of the invention and vice versa. When component A) is mentioned for preferred embodiments, this also applies to the adhesive composition itself in a 1K system.

DEFINITIONS

In the present application all terms have the meaning generally known in the field unless stated otherwise.

With "one-component adhesive composition" is meant in the present application (unless stated otherwise): an adhesive composition that reacts with ambient moisture to provide adhesive functionality. Where adhesive is used in the present invention, this should be read as either an adhesive or a sealant or a coating.

With "two-component adhesive composition" or "two-component system" or "2K system" is meant in the present application (unless stated otherwise): an adhesive composition that requires at least two separate components (each optionally comprising several compounds) which upon mixing react with each other to provide adhesive functionality. Where adhesive is used in the present invention, this should be read as either an adhesive or a sealant or a coating.

With "moisture cross-linking polymer" is meant in the present application (unless stated otherwise): a polymer that cross-links upon contact with moisture, for example in the form of water or water vapor from surrounding air. Other names that have the same meaning in the context of this application are humidity hardening polymers, or water-curing polymers.

With "cross-linking catalyst" is meant in the present application (unless stated otherwise): an agent that reacts with the cross-linking polymer in the presence of moisture to activate and accelerate the cross-linking reaction.

With "rheology controller" is meant in the present application (unless stated otherwise): an agent that controls the rheology or in other words the flow of materials. These are substances which, when added to a mixture, increase its viscosity. A "thixotropic agent" is a special type of rheology controller that increases the thixotropic behavior of a gel or fluid, i.e. fluids that are thick or paste-like (viscous) under normal conditions, but flow (become thin, less viscous) when stressed (e.g. shaken) or said otherwise an agent giving a lower viscosity under shear than under no shear.

With "early strength" is meant in the present application (unless stated otherwise): the strength directly after application of the adhesive and prior to the cross-linking and/or curing of the adhesive. Other words that are often used having approximately the same meaning are green strength, in between strength, direct grip, slump resistance or tackiness.

With "organoclay-based" in view of the rheology controller is meant in the present application (unless stated otherwise): based on an organoclay. An organoclay being an inorganic or mineral-based clay that is organically modified. In other words, an organoclay is an organically modified phyllosilicate, derived from a naturally occurring clay mineral.

With "organically modified" in view of the rheology controller is meant in the present application (unless stated otherwise): modified using an organic group, preferably a quaternary ammonium compound, more preferably an alkyl quaternary ammonium compound.

With "alkyl ammonium salt-modified mineral clay mixture" in view of the rheology controller is meant in the present application (unless stated otherwise): a mixture of at least two kinds of mineral clay that have been organically modified by using one or more alkyl ammonium salts or compounds. Preferably, the modification takes place at the surface of the clay particles. The clay particles are hence preferably surface-modified.

With "inactivated form" or "deactivated" in view of the rheology controller is meant in the present application (unless stated otherwise): that the thickening capacity of the rheology controller has been reduced to such an extend that preferably less than 20% of its originally value is maintained, preferably less than 10%, more preferably less than 5%. This can be measured by any known technique as long as the measurement before and after inactivation is carried out in the same manner. An example of a technique that can be used is the rotating method described below using a Rheometer Physica MCR300. It should be noted that the inactivated form of the rheology controller can be obtained in the present adhesive composition in several ways. The present inventors have found that for organoclay-based rheology controllers the thickening effect can be reduced when reducing the amount of water in the organoclay-based rheology controller that is available to interact with the rheology controller. In other words, if the water content (or available water content) is lowered to below a certain value, the thickening effect is significantly reduced and the rheology controller is inactivated. The water content can for example be reduced by physically drying (i.e. by heating) the rheology controller prior to addition to the rest of the adhesive composition, such as the polymer and optional fillers. However, it should be noted that water may also be present in other components, such as the polymer and optional fillers. In one embodiment, each of the separate components is dried (e.g. physically by heating) before the adhesive composition is formed. In another embodiment, the components are first mixed (preferably without any optional catalyst which increase the possibility of prematurely curing before water has been removed) and then the mixture is physically dried. In yet another method the water is removed in a chemical manner by adding so called moisture scavengers (explained below). These scavengers can be added to the adhesive composition in such an amount that the level of available moisture is kept sufficient low to keep the rheology controller inactive. A combination of these two methods is also possible.

With "reactivated form" or "reactivated" in view of the rheology controller is meant in the present application (unless stated otherwise): that an inactivated rheology controller has regained its activity to a level of preferably at least 80%, preferably at least 90%, more preferably at least 95%, even more preferably at least 99% of its value before inactivation (i.e. its original or starting value). This can be measured by any known technique as long as the measurement before and after reactivation is carried out in the same manner. An example of a technique that can be used is the rotating method described below using a Rheometer Physica MCR300.

With "silyl modified polymers" or "SMP" is meant in the present application (unless stated otherwise): polymers that have been modified with reactive silyl groups, preferably at the termini (=ends) of the backbone or at the termini of any side branches. In other words, reactive silyl groups have been attached to the polymer chain. These SMP cross-link to each other via hydrolysis and condensation reactions to form a three dimensional elastic polymer network. The term "silylated polymer" is also used in this respect and has a similar meaning. It means that silyl groups have been attached to the polymer.

With "reactive silyl group" is meant in the present application (unless stated otherwise): a silicon-containing chemical group that is capable of hydrolyzing in the presence of moisture to form siloxane linkages. In other words: a water-reactive group containing a silicon atom that is capable of forming siloxane bonds with another reactive silyl group. Other terms that are used and have approximately the same meaning are: "silyl containing functional groups" or "silicon containing functional group" or "reactive silicon group".

With "Modified Silyl polymers" is meant in the present application (unless stated otherwise): a curable organic polymer having silicon containing functional groups (at one or more termini of the backbone or side chains) capable of cross-linking by forming siloxane bonds. These Modified Silyl polymers are a subclass of silyl modified polymers (SMP) that are marketed e.g. under the trade name of MS-Polymers® by Kaneka company of Japan.

With "silyl-terminated polymer" (STP) is meant in the present application (unless stated otherwise): a polymer modified at one or both its ends with reactive silyl groups. The term "silyl-end capped polymer" is also used in this respect and has the same meaning.

With "silyl-terminated polyether" (STPE) is meant in the present application (unless stated otherwise): polyether modified at one or both its ends with reactive silyl groups. The term "silyl-end capped polyether" is also used in this respect and has the same meaning.

With "silyl-terminated polyurethane" (STPU) is meant in the present application (unless stated otherwise): polyurethane modified at one or both of its ends with reactive silyl groups. The term "silyl-end capped polyurethane" is also used in this respect and has the same meaning.

With "prepolymer" is meant in the present application (unless stated otherwise): a polymer having at one or more of its termini (of the backbone or side branches) a reactive non-silyl group that acts as a precursor or intermediate in the synthesis of a polymer end-capped with reactive silyl group. In other words, these prepolymers contain reactive groups that can be converted into silyl groups by organic synthesis. Examples or these groups are alcohol groups, amine groups, epoxy groups or isocyanate groups.

With "viscosity" is meant in the present application (unless stated otherwise): the dynamic viscosity of a liquid or gel expressed in units of Pascal second (Pas or Pa·s)

measured at a temperature of 23° C. by the method described below for the Rheometer Physica MCR300 in rotation mode.

With "shear rate" or "$\dot{\gamma}$" or "(γ dot)" is meant in the present application (unless stated otherwise): the time dependent rate of deformation of the adhesive compound.

With "cross-linked" is meant in the present application (unless stated otherwise): the coupling together of two or more polymer chains in a way that a three dimensional network is formed with elastic properties.

With "cured" is meant in the present application (unless stated otherwise): the curing or hardening (toughening) of a polymer material.

DETAILED DESCRIPTION OF THE INVENTION

This invention relates to an adhesive or sealant composition suitable for use for industrial or domestic applications where high viscosity, high mechanical strength, quick curing, excellent adhesion and/or high initial tack (early strength) are required. The invention also relates to a process for the preparation of the composition.

The present invention is based on the finding that an organoclay-based rheology controller loses its thickening effect in the absence of water, but regains it upon contact with moisture. The inventors have had the inventive insight that regaining of the thickening effect, and therewith the rheology controlling aspect, coincides with the crosslinking effect of moisture curing adhesives (or moisture cross-linking polymers). By this insight, relatively low viscous 1K adhesive compositions can be provided, that are substantially water free, of which the viscosity increases to the desired value for early strength, or tack, upon application by contact with moisture from the air, while crosslinking of the polymer occurs simultaneously. Accordingly, 2K adhesives are provided that have a low viscosity upon application, and where the viscosity of both components can be adjusted to one another, and where both regaining of the thickening effect of the rheology controller and crosslinking of the polymer take place simultaneously upon combining the two components.

The invention thereto relates in a first aspect to an adhesive composition, usable for activation by moisture, said adhesive composition comprising a moisture cross-linking polymer and an inactivated organoclay-based rheology controller. More details about values for the water content of the specific components and the composition are disclosed below in relation to the second aspect of the present invention. These details also relate to this first aspect of the invention.

The present invention also relates to an adhesive composition comprising a first component A) based on a moisture cross-linking polymer and comprising an organoclay-based rheology controller; and on a second component B) comprising water.

More details about the preferred embodiments of these aspects and other aspects of the invention are provided below and in the appended claims.

1K Composition or Component A) of a 2K System

The essential ingredients of the 1K composition or component A) of a 2K system are one or more moisture cross-linking polymers and an organoclay-based rheology controller. In addition, there are several optional ingredients, such as a cross-linking catalyst, a water scavenger, UV/heat stabilizers, adhesion promoters, fillers and/or pigments. These essential and optional ingredients are disclosed in more detail below.

In an embodiment, the 1K composition or component A) of a 2K system comprises water in an amount that is equal to or less than 0.5 w/w. %, preferably 0.3 w/w. % or less, more preferably 0.2 w/w. % or less or even 0.1 w/w. % or less, based on the weight of the 1K composition or component A) of a 2K system.

Since the moisture cross-linking polymers may premature react in case water is present in the 1K composition or component A) of a 2K system, it is preferred to keep the water level of the 1K composition or component A) of a 2K system at the values disclosed above. Prematurely reaction will lead to a hardening of the 1K composition or component A) of a 2K system inside of the container and part or all of the adhesive effect will be lost.

In case water scavengers (see below) are added to the 1K composition or component A) of a 2K system the water content will be decreased to almost zero to guarantee a good storage stability.

Moisture Cross-Linking Polymers

The moisture cross-linkable polymer for use in the present invention is preferably a polymer having silicon-containing chemical groups that are capable of hydrolyzing in the presence of moisture—and optionally a catalyst—to form siloxane linkages via a condensation reaction. Examples of moisture cross-linking polymers that are very suitable for use in the present invention are silyl-modified polymers (SMP). In these SMP a polymer backbone of e.g. polyether, polyurethane or polyester or other type of polymer is modified on one or both ends of the backbone and/or side branches with moisture reactive silyl groups. Examples are the MS-polymers of Kaneka as disclosed below.

The preferred molecular weight ($M_w$) of the silyl-modified polymers as used in the present invention is between 3000 and 60000, preferably between 5000 and 25000. With a molecular weight of below 3000, the degree of cross-linking is relatively high which will lead to a more rigid three dimensional network that may be undesired if the cured adhesive should still be resilient. If the molecular weight is above 25000, there may be less cross-linking groups available to provide sufficient strength and the resulting polymer will be very soft in nature, that may be undesired depending on the type of application or use.

Preferably, the moisture reactive silicon-containing groups are attached to an organic polymer (e.g. polyether). In an other embodiment, silicone polymers having a siloxane repeating backbone can also be used as the basis for attachment of the reactive silicon-containing groups according to the present invention. The silicon containing functional groups are capable of cross-linking by forming siloxane bonds, e.g. alkoxy-silyl groups, for example the —Si(R)$_k$(OX)$_{3-k}$ group where k is an integer equal to 0, 1 or 2 and R represents a saturated or unsaturated alkyl group, for example a methyl or ethyl group.

When cross-linked, such polymers give rubbery and resilient, elastomeric networks with a degree of cross-link density depending on the number of hydrolysable groups in the polymer molecule and on the kind and amount of the cross-linking agent and other water-reactive agents.

The organic polymer bearing the moisture cross-linkable groups is preferably a polyether, a polyester or mixtures of these. An example of a suitable polyether is a polyoxypropylene polymer, for example having two hydrolysable (bis-methoxy methyl silyl) groups at each end of the polymer molecule coupled via a propyl spacer:

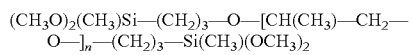

Further examples of suitable polymers having the same functional groups but a different polymer backbone may be represented as:

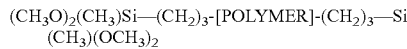

where [POLYMER] represents a polymeric backbone, preferably an organic polymer, such as a polyether or a polyester. A silicone polymer ($\alpha,\omega$-polysiloxanes) having siloxane bonds (Si—O—Si) can also be used. Such organic polymers are available commercially. The polyethers in which the POLYMER group is a polyoxypropylene, or acrylic modified polyoxypropylene group and the silyl group is a silicon-containing group with one methyl group and two methoxy groups attached to this silicon atom are available under the Trademark "Kaneka MS-Polymer®" (Kanegafuchi Chemical Industries) or also called MS-polymer in this description. Examples of commercially available products that are especially suitable for the present invention are MS-polymers S303H or S203H.

The main chain or backbone of the MS-Polymers (with or without acrylic modification) can be described as polymer structures having diol or triol functionalities wherein each chain-end contains zero or one silyl group. For each polymer chain there should be more than one silyl group. For example in the case of a triol functionality two of the three groups could contain a silyl group. In other words, preferably at least 60% until maximally 100% of the groups that are attached to the silyl group (viz. the methoxy, ethoxy and methyl groups) are selected from methoxy and ethoxy. The remainder being a methyl, ethyl, methoxy or ethoxy group.

Polyurethane modified polyols may be usable prepolymers according to the invention. Such prepolymers may be based on polyols, preferably diols or triols, such as polyether or polyester polyols or polyalkylene diols, for example polyethylene ether diols or triols, polypropylene ether or triols, polytetramethylene ether diols or triols or block copolymers or blends comprising any of the above diols or triols.

The modification of the polyols is the conversion by reaction with diisocyanates such as MDI (methylene diphenyl diisocyanate), TDI (toluene diisocyanate), HDI (also called HMDI) (hexamethylene diisocyanate) TMXDI® ((meta) aliphatic isocyanate), or IPDI (isophorone diisocyanate), to convert the hydroxyl groups to isocyanate groups which are then reacted with sufficient of an amino-alkoxysilane to destroy essentially all of the isocyanate groups and form reactive silyl groups.

The amino alkoxy silane may have the formula:

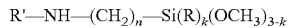

where R' represents a hydrogen atom or an alkyl or aryl group, R represents an alkyl group such as methyl or ethyl and n and k represent integers, wherein n is preferably 1 or 3 and wherein k is preferably 0, 1, or 2. In case k is 2 on all polymer chains, no true cross-linking would take place and only a linearly linked polymer is obtained.

Examples of the resulting silyl-terminated polymers may be represented as

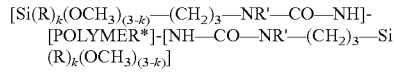

where POLYMER* represents a polyether- or polyester-urethane grouping such as a polyoxypropylene-urethane grouping, R and R' represent alkyl groups, the silyl group optionally contains R-groups and k represents an integer, selected from 0, 1, and 2.

Another reaction mechanism suitable for the production of silyl end-capped polymers is the reaction of the isocyanate-terminated prepolymer with allyl alcohol (e.g. HOCH$_2$CH=CH$_2$) and/or with a mercapto-silane (e.g. HS—(CH$_2$)$_3$—Si(OCH$_3$)$_3$). Examples of the latter polymer may be represented as:

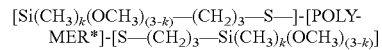

where POLYMER* again represents a polyether- or polyester-urethane grouping such as a polyoxypropylene-urethane grouping and k represents an integer equal to 0, 1 or 2.

It is also possible to produce silyl end-capped polymers suitable for use in the practice of the invention by directly reacting a mono-isocyanate alkoxysilane with the hydroxyl groups of a polyol as described above. Examples of such polymers may be represented as:

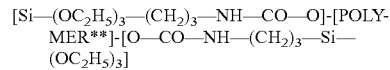

or

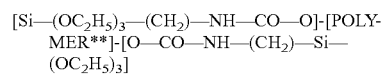

where POLYMER** represents a polyether or polyester group. It should be noted that the ethoxy groups attached to the silicon atom could also be methoxy groups or a mixture thereof. The spacer as shown above —(CH$_2$)$_3$— is called a $\gamma$-coupling. Another option for the spacer is —(CH$_2$)— which is called an $\alpha$-coupling or a mixture of both spacers.

In general, the silyl group used in the practice of this invention may be represented as

where R" is a methoxy or ethoxy group, R is an alkyl group and k is an integer, preferably 0, 1, or 2.

In the production of silyl end-capped polymers having a polyurethane backbone, primary or secondary aminoalkoxysilanes or vinylalkoxy silanes may be used.

The moisture-cross-linking polymer may suitably be present in about 20 w/w. % to 80 w/w. % of the 1K composition or component A) of a 2K system, preferably in about 25 w/w. % to 60 w/w. %, more preferably in about 30 w/w. % to 40 w/w. %, based on the weight of the 1K composition or component A) of a 2K system.

Rheology Controller

In addition to the moisture cross-linking polymer, the 1K composition or component A) of a 2K system also comprises a rheology controller. The rheology controller should preferably be capable of giving sufficient thickening for satisfactory application of the non cross-linked composition to inclined or vertical surfaces. This rheology controller provides in between thickening or early strength until cross-linking has completed.

The composition is held in the non-cross-linked state in storage and would be of insufficient initial viscosity for satisfactory application in the absence of an added rheology controller. In the present invention the rheology controller is preferably activated upon exposure of the composition to ambient moisture for the 1K composition or for a 2K system by mixing of component A) with component B). Water is the polar agent present in the component B) which will activate this rheology controller for a 2K system.

Examples of known thixotropic agents are polyamide waxes. Examples of commercially available polyamide waxes are Disparlon® and CrayVallac®. Other types of rheology controllers used in the art are dehydrogenated castor oil types and mixtures of dehydrogenated castor oils with polyamide waxes. Another example of a thixotropic agent often used in the art is fumed silica.

According to the present invention an organoclay-based rheology controller is used. Preferably, an alkyl quaternary ammonium salt-modified (or treated) mineral clay mixture is used as the rheology controller. The inventors have found that optimal results have been obtained by using this type of rheology controller.

An example of an organoclay-based rheology controller is "Mixed Mineral Thixotrope" or MMT which is inorganic in nature and based on organoclays. These organoclays are marketed e.g. by Southern Clay Products with the Tradename Garamite® (e.g. Garamite 1958 is especially useful in the present invention). MMT technology involves the blending of acicular (needle like) and plate-like (or platelet) minerals that are then surface modified for resin compatibility. In comparison to polyamide waxes or fumed silica 20 to 40% less material is required to obtain the same rheology results. The combination of different mineral morphologies promotes particle spacing creating a product that disperses very easily. It is described in US2002/0002230A1 of Southern Clay Products that combinations of clay materials are reacted with quaternary ammonium compounds to provide the Garamite® additives. Preferably phyllosilicates are used as clay. Said clay mixtures according to US2002/0002230 A1 may comprise mineral clay (a) comprising greater that 50 w/w. % (preferably 60-95 w/w. % or 70-90 w/w. %) based on the weight of the mineral clay mixture of a mineral clay, selected from the group consisting of sepiolite, palygorskite, and mixtures of sepiolite and palygorskite; and mineral clay (b) comprising less than 50 w/w. % based on the weight of the mineral claim mixture of a smectite (e.g. hectorite or others such as montmorillonite, bentonite, beidelite, saponite, stevensite and mixture thereof). The production of this type of additive is disclosed in detail in paragraph [0011] of US2002/0002230A1 which is incorporated by reference. The quaternary ammonium compounds (preferably alkyl quaternary ammonium salts) are described in [0014] of US2002/0002230A1 which is incorporated by reference. These organoclays are often in the form of nanoparticles (i.e. particles having at least one dimension on nanometer scale). The organoclay-based rheology controllers comprise an inorganic mineral thixotropic agent based on a plurality of mineral platelets, said platelets having substantially hydrophobic surfaces and substantially hydrophilic sides.

WO2005/052630 of Huntsman Advanced Materials discloses alkyl ammonium modified organoclays and the use thereof in both components of a two component epoxy system.

In a preferred embodiment, the water content of the rheology controller has to be equal to or less than 0.5 w/w. % of the rheology controller, preferably less than 0.3 w/w. % and more preferably less than 0.1 w/w. %.

In case a Garamite product (i.e. Garamite 1958) is used, the water content of the commercially available product is approximately 5 w/w. %. In order to decrease the water content, the rheology controller has to be dried until the desired water content, such as 1.0 w/w %, preferably 0.8 w/w %, most preferably 0.5 w/w % is reached, e.g. by heat treatment at a temperature above 100° C., e.g. 120° C. The water uptake of Garamite stops when an equilibrium is reached. After the heat-treatment the dried rheology controller is preferably stored in moisture-tight containers (e.g. aluminum bags) in order to prevent re-hydration (stated otherwise the re-uptake or re-absorption of moisture).

Other types of rheology controller that are suitable for the present invention are organically modified clays, said clays could be selected from the clay mineral group of phyllosilicate: i) kaolines (hydrated Al-silicates); ii) bentonites (colloidal clay compositions); iii) Palygorskite or attapulgite (magnesium aluminium phyllosilicate); or iv) other types of phyllosilicates, such as Halloysite, Illite, Montmorillonite, Vermiculite, Talc or Pyrophyllite or v) so called nanoclays comprising nanoscale particles such as hydrotalcite, octasilicate, mica fluoride and montmorillonite.

Organically modified Hectorite clay is another example that is suitable. This is a smectite clay mineral (sodium lithium magnesium silicate). Hectorite is commercially available from Elementis GmbH. Hectorite-clay can be modified by an alkyl quaternary ammonium compound to become an organoclay-based rheology controller that is suitable for the present invention.

The type of organic modification of the clays as cited above can be selected based on the requirements of use.

Long-chain alkyl quaternary ammonium compound-modified organoclays are more suitable for non-polar systems whereas those modified with short chain alkyl quaternary ammonium compounds are more suitable for mid-to-high polarity systems. This also depends on the type of clay that is used and its particle morphology. So based on the requirements and the type of clay used, the organo-compound suitable for the modification of the clay can be selected by a person skilled in the art.

It has been found that upon reducing the water content of these organoclay-based rheology controllers (e.g. Garamite®), the thixotropic action is severely reduced. This dried form of the rheology controller is also called the inactivated form. This thixotropic action can be restored upon addition of either water or certain organic polar agents. This restored form of the rheology controller is called the reactivated form.

The present inventors have observed that they can use this decreased activity (or inactivity) to provide a low viscous adhesive, either as single or two component system, that increases in viscosity when in contact with water, i.e. by moisture of the air for 1K systems, and upon contacting of both components in 2K systems, while simultaneously the water mediated crosslinking of the polymer takes place.

The rheology controller is preferably used in an amount of between 0.5 w/w. % and 10 w/w. % based on the weight of the 1K composition of in component A) of a 2K system, more preferably of between 2 w/w. % and 7 w/w. %, even more preferably between 4 w/w. % and 5 w/w. %.

Deactivated organoclay-based rheology controller (e.g. dried Garamite®) can be reactivated by water (as in the present invention) or by the use of a non-water organic material, such as propylene carbonate or an alcohol. The present adhesive composition is preferably free of (non-water) organic activating compounds, such as e.g. several types of alcohol compounds, e.g. decanol, or propylene carbonate, or polypropylene glycol (e.g. PPG600 or PPG900 of BASF), or acetone or in general strong polar organic agents. In other words, the amount of organic activating compounds in component A) is preferably equal to or less than 0.5 w/w. %, more preferably less than 0.3 w/w. % and most preferably less than 0.1 w/w. %.

However, for certain applications it could be envisaged that these (non-water) organic activating compounds, such as e.g. several types of alcohol compounds, e.g. decanol, or propylene carbonate, or polypropylene glycol (e.g. PPG600 or PPG900 of BASF), or acetone or in general strong polar organic agents are present.

In other words, the organoclay-based rheology controller is present in the 1K composition or component A) of a 2K system of the adhesive composition according to the present invention most preferably in deactivated form, which is to be activated only upon contact with ambient moisture and/or component B) of the adhesive composition. It would be possible to add a non-water organic material, to the water-based component B) if desired in addition to water, i.e. to adjust a desired viscosity to component B.

Water in component B) acts as cross-linker and/or accelerator for component A).

The same is true for a 1K composition, where the deactivated organoclay-based rheology controller is present in the composition and becomes activated by contact with the moisture from the air upon application. Preferably, no organic polar agent is present to avoid premature thickening.

Cross-Linking Catalyst

A cross-linking catalyst or a cross-linking promoting catalyst may optionally be present in the 1K composition or component A) of a 2K system. This component accelerates the reaction of the 1K composition or component A) with component B) and ensures a decrease in the cross-linking time.

If a catalyst is used, this may be any catalyst which has activity in relation to the cross-linking of the hydrolysable groups, such as the silyl groups of polymers usable in the present invention. Organotin catalysts, for example, preferably, dibutyltindiacetylacetonate (DBTDAA), or dioctyltin-diacetylacetonate (DOTCAA) or dibutyltindilaurate (DBTDL), dibutyltindiacetate, dibutyltin-dibutylate, or tinoctoate are very suitable for use. Alternatively, orthotitanates and other organic titanates (titanium chelates) such as diisopropoxy-titaniumbis(ethylacetoacetate), dibutoxy-titanium-bis(ethylacetoacetate), titanium acetylacetonate or dibutoxy-titanium-bisacetylacetonate may also be used. An commercially available catalyst that is very suitable is Neostann™ S1, which is marketed by Nitto Kasei Co., Ltd, from Japan.

A suitable quantity of catalyst may be between 0.1 w/w. % and 1 w/w. %, preferably between 0.2 w/w. % to 0.6 w/w. % based on the weight of the total adhesive composition.

Moisture Scavenger or Water Scavenger

It is important that the moisture content be controlled to prevent immediate cross-linking of the moisture cross-linking polymer which would result in increasing viscosity or even solidification of component A) during storage. Moisture may be imported into component A) via fillers, pigments and/or other types of additives which may be present.

As disclosed above water can be removed from the separate components prior to mixing or from the adhesive composition during or after mixing by physical means, such as drying, preferably by heat.

In order to increase shelf-life and to decrease the water content, a water scavenger (also called moisture scavenger) can be present.

Hence, the 1K composition or component A) in a 2K system of the present invention may comprise one or more moisture scavengers. Suitable moisture scavengers are alkoxy silanes, for example, preferably, trimethoxy vinyl silane (VTMO-silane=Vinyl TriMethOxy silane) or triethoxy vinyl silane, trimethoxy methyl silane or triethoxy methyl silane, or methyl- or vinyl-tris(2-butanoneoximino) silanes or, also, products such as Zusatzmittel-TI (trademark of Bayer). Another example is AMMO-silane (3-AMinopropyltriMethOxy silane) or a combination thereof with VTMO-silane.

The moisture scavenger may suitably be present in from about 1% to about 5% by weight of the 1K composition or of component A) of the 2K composition. The reaction of the moisture scavengers, especially the alkoxy silanes, with water is also accelerated by the catalysts identified above.

Additional Components for a 1K Composition or for Component A) in a 2K System

Moreover, an adhesion promoter may be present in the 1K composition or component A) in a 2K system of the present invention. The adhesion promoter is preferably an organosilane compound such as, for example, amino-, mercapto- or epoxy-containing alkoxy, suitably tri-alkoxy silanes. These compounds, and also the mono-alkoxysilanes and the siloxanes, take part in hydrolysis and silanol condensation reactions when moisture from outside becomes available. Using suitable silanes or siloxanes as cross-linkers, adhesion promoters or chain-extenders excellent adhesion properties and a well-defined cross-linking density may be achieved. Using an optimal mixture of amino- and epoxy-based trialkoxysilanes it is possible to improve also the water resistance of the cured adhesive. A suitable quantity of adhesion promoter may be from 0.5% to 5.0 w/w % of the 1K composition or component A), respectively.

Viscosity of the 1K Composition or Component A) in a 2K System

In yet another embodiment, the rheology controller is present in inactivated form, able to reactivated by ambient moisture (for a 1K composition) or by component B) (for a 2K composition). This is an important aspect of the present invention. The viscosity of a 1K composition or component A) of a 2K system can be kept sufficient low to ensure good working versatility. In addition, for 2K systems, compatibility and ability to mix with component B) is ensured as well. After reactivation by water the viscosity of the 1K- or 2K-composition is sufficient high to ensure good early strength.

In yet another embodiment, the 1K composition or component A) in a 2K system has a dynamic viscosity of between 20000 and 40000 Pas as measured at 23° C. at a shear rate of $0.1\ \text{sec}^{-1}$.

In yet another embodiment, the 1K composition or component A) in a 2K system has a dynamic viscosity of between 3500 and 4500 Pas as measured at 23° C. at a shear rate of $1.0\ \text{sec}^{-1}$.

In yet another embodiment, the 1K composition or component A) in a 2K system has a dynamic viscosity of between 800 and 1200 Pas as measured at 23° C. at a shear rate of $5.0\ \text{sec}^{-1}$.

Component B)

Component B is a water-containing homogeneous and stable component comprising in addition to water, for example fillers and/or a binder in order to give component B the desired texture and viscosity. Component B is only present in 2K systems, not in 1K systems.

Component B) can for example be a dispersion type composition. For example, using an acrylic or styrene-acrylic polymer or copolymer in the form of polymer droplets that are dispersed and stabilized in water. Preferably fillers are present.

Another type of component B) is based on MS-Polymer comprising a reactive plasticizer (see below). A molecular sieve is present that holds the water in component B) until it is mixed with component A).

Components B) are known in the field. One example of a component B) that is very suitable for the present invention is a combination of two binders: a styrene-acrylic copolymer (type EG36 of Bostik) and a vinyl acetate/acrylic ester copolymer (Emulsion EF16 of Bostik). The water content of component B) is introduced via these binders.

Preferably, fillers (such as calcium carbonates) and stabilizers (in low amounts) are also present.

The water content of component B is preferably between 1 and 50 w/w. %, more preferably more than 5 w/w. % or even more that 20 w/w. %, even more preferably maximally 40 w/w. % based on the weight of component B).

Component B) may optionally comprise stabilizing agents, such as polyamide wax-based thixotropic agents as described before. A person skilled in the art of adhesives will know which type and quantity of stabilizing agents to use.

Moreover, component B) may optionally comprise water binding agents, such as a molecular sieve. A person skilled in the art of adhesives will know which type and quantity of molecular sieves to use.

Moreover, component B) may optionally comprise one or more plasticizers that are commercially available as described before. A person skilled in the art of adhesives will know which type and quantity of plasticizers to use.

Moreover, component B) may optionally comprise one or more reactive plasticizers, such as silyl group containing plasticizers as commercially available. Kaneka markets a "reactive diluent" that can be used as a reactive plasticizer under the brand name of RD359. A person skilled in the art of adhesives will know which type and quantity to use.

According to the present invention, preferably the water content of component B) is between 15 and 30 w/w. %, more preferably between 20 and 25 w/w. % of the weight of component B).

Viscosity of Component B

In yet another embodiment, the component B) has a dynamic viscosity of between 2000 and 3500 Pas as measured at 23° C. at a shear rate of 0.1 $sec^{-1}$.

In yet another embodiment, the component B) has a dynamic viscosity of between 100 and 300 Pas as measured at 23° C. at a shear rate of 5.0 $sec^{-1}$.

Additional Components for the 1K System or for Either or Both of Component A) and Component B) in a 2K System The composition or components of the invention may suitably or advantageously contain pigment particles in either or both of components A) and B). The pigment may comprise carbon black or titanium or iron oxides or may comprise one or more inorganic pigments instead of or in addition to the carbon black. A suitable quantity of the pigment may be about 0.2% to 5% by weight of the component in which it is present as required depending on the nature of the pigment.

The composition or components may also suitably contain fillers, plasticizers, stabilizers, UV-absorbers and/or antioxidants. A suitable filler may be, for example, calcium carbonate the filler being present in, for example, 25% to 55% by weight of the component in which it is present. The precipitated calcium carbonates, with their extremely small particle size distribution and preferred coating, for example with fatty acids, surfaces, give a contribution to the viscosity and slump resistance of the compositions. Also, the mechanical strength of the cured adhesive or sealant compositions is dependent on the solid state characteristics of the calcium carbonates used. An optimal composition may be reached using suitably selected mixtures of preferably coated, precipitated or natural ground calcium carbonates as fillers. A suitable stabilizer may be selected from the hindered amine light stabilizers, such as for example the product available under the Tradename Tinuvin 770. A suitable UV absorber may be selected from the benzotriazoles or the benzophenones for example the product available under the Tradename Tinuvin 328. A suitable antioxidant may be selected from, for example, the products available under the trade name Irganox 1010 or 1035 or 1076.

Other known additives may be present in the 1K composition or in component A) and/or component B) of a 2K system as readily known by a person skilled in the art.

Component A and Component B

In another embodiment, the ratio of component A) to component B) is between 1:25 and 100:1 or between 1:1 and 100:1, preferably between 10:1 and 60:1, more preferably between 30:1 and 50:1. This ensures a good balance between early strength, speed of cross-linking and final strength.

Storage

To isolate the 1K composition or component A) of a 2K system from ambient moisture which might cause premature cross-linking, the said composition or component is preferably contained for storage in a water-impermeable container. Thus, the composition or component is preferably packed in an air-tight container to protect it from ambient moisture. One suitable impermeable material for the container is high density polyethylene or polyethylene coated with aluminum foil. The container is suitably in the form of a cartridge or respectively in the form of a sausage suitable for use in conjunction with application equipment. A storage stability of up to 2 to 4 years may be anticipated for certain of the compositions, without plasticizer or with a minimum of plasticizer. For a 2K system each of the components is packed separately, either in separate containers or in separate chambers or a single container.

Method of Preparation of the 1K Composition or Component A) of a 2K System

A preferred order of addition is to initially combine the cross-linking polymer, optionally the pigment, the rheology controller and optionally the filler under low speed mixing followed by optionally a high speed mixing under vacuum to increase the temperature to at least 40° C. and/or, preferably, not more than 45° C. The moisture scavenger, if present, is preferably introduced into this heated mix under vacuum followed by mixing. Preferably, any extra additives (e.g. catalyst)—if present—are added after this under vacuum followed by mixing.

Component A) so formed is filled into one chamber of a dual-chamber water-impermeable container (or a separate container) and sealed therein.

Method of Preparation of Component B)

All of the ingredients of component B) can be mixed together with standard mixing methods and equipment. There is no particular order in which the ingredients are to be added. A person skilled in the art will be able to determine the best way of preparing component B) based on the ingredients of component B).

Method of Measuring Rheology Characteristics

The rheology of the adhesive composition is judged by measuring the dynamic viscosity using a Physica Rheometer MCR 300. A rotation measurement conducted at a temperature of 23° C. is carried out using a Plate-Plate measuring system with a diameter of 25 mm and a gap of 1 mm. After 120 seconds waiting time the plate is rotated to obtain a flow curve. The values for shear rates at 0.1 $sec^{-1}$, 1.0 $sec^{-1}$ and 5.0 $sec^{-1}$ are deducted from this flow curves. The resulting dynamic viscosity is given in units of Pascal seconds or Pa·s.

Viscosities are measured as a function of the shear rate. The viscosity decreases with increasing shear rate. This is called plastic or pseudo plastic behavior. Viscosity values at different shear rates are measured to obtain the so-called "flow curves". From these flow curves the viscosity at specific shear rates is extracted. These values give information about different aspects of the rheology controller. For example, the viscosity at a shear rate of 0.1 sec$^{-1}$ provides information about the slump resistance. The viscosity at a shear rate of 5 sec$^{-1}$ provides information about the processability, in other words, the gunability.

Method of Measuring Early Strength

In a first step component A) and component B) are mixed to a homogenous mixture. Directly after the mixing a layer having a thickness of approximately 3 millimeter is applied between two aluminum plates having a size of 50×40 mm (surface of 2000 mm$^2$). To the back side of the plates (opposite to the sides onto which adhesive is applied) a pin or beam is present to be able to exert force to the plates. Directly after the application of the "fresh" adhesive composition the plates are pulled apart with a pulling speed of 600 mm/minute using a standard tensile tester (Zwick/Roell Z050).

Other Aspects of the Present Invention

The present invention also provides cured adhesives based on adhesive compositions according to the present invention.

The present invention also relates to the use of the present one- or two-component adhesive compositions for the elastic bonding of two or more like and/or different substrates. Examples of substrate materials are metal, painted metal, glass, wood, plastic or ceramics.

In another aspect, the present invention relates to kit of parts comprising two containers, wherein said two containers each contain a component of a two-component adhesive composition: a first container comprising component A) based on a moisture cross-linking polymer and comprising an organoclay-based rheology controller; and a second container comprising component B) comprising water. The said kit preferably further comprises compression means and more preferably also a static mixing head, wherein said mixing head is capable of receiving component A from the first container and component B) from the second container simultaneous. Preferably said compression means can be designed as a plunger or pusher rod in a syringe or cylinder like kit guns. The compression means are preferably coupled to each other so that manual pressure on the compression means compresses both chambers/containers of component A) and B) so that a predetermined and pre-set amount of component A) and B) is released to said static mixer to provide the correct ration between component A) and B). However, in an attractive cost-effective embodiment, the static mixer is absent. In that case, both components A) and B) have to be mixed after release from their respective containers.

In another aspect, the present invention relates to a method of preparation of an adhesive composition by combining two-components A) and B) of a two-component adhesive composition according to present invention, wherein said moisture cross-linking polymer is cross-linked and/or cured by the addition of component B) to component A) and wherein said rheology controller present in component A) is reactivated by said component B).

In a further aspect, the invention relates to an one-component dual action adhesive composition based on a moisture cross-linking polymer and further comprising an organoclay-based rheology controller; and composition showing dual action upon contact with moisture, being physical action by means of reactivation of said rheology controller and chemical action by cross-linking and/or curing of said moisture cross-linking polymer.

In another aspect, the invention relates a two-component dual action adhesive composition based on two separate components A) and B), component A) being based on a moisture cross-linking polymer and further comprising an organoclay-based rheology controller; and component B) comprising water; said first component A) showing dual action upon addition of component B), being physical action by means of reactivation of said rheology controller and chemical action by cross-linking and/or curing of said moisture cross-linking polymer.

An advantage of the adhesive composition according to the present invention is that it can be used to join substrates together without the need of mechanically fastening or securing the substrates immediately after application of the adhesive and prior to cross-linking thereof.

More embodiments can be found in the appended claims.

The invention is further elucidated by means of the following examples, which do not limit the scope of the claims.

EXAMPLES

Example 1

Organoclay-Based Rheology Controller—No Catalyst

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), and functional silanes, namely 2.8 grams of a VTMO-silane (Vinyl TriMethOxy silane) and 1.4 grams of a AMMO-silane (3-AMinopropyltriMethOxy silane) (total of 4.2 grams). No organic tin-based catalyst was added. To this mixture having a total weight of 100 grams was added 5 parts by weight of organoclay-based rheology controller Garamite® 1958, containing 4-6 wt. % of water. The mixture was mixed again to form either an one-component adhesive composition according to present invention or component A) of a two-component adhesive composition according to the present invention.

Example 2

Deactivated Organoclay-Based Theology Controller—No Catalyst

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), and functional silanes, namely 2.8 grams of a VTMO-silane (Vinyl TriMethOxy silane) and 1.4 grams of a AMMO-silane (3-AMinopropyltriMethOxy silane) (total of 4.2 grams). No organic tin-based catalyst was added. To this mixture having a total weight of 100 grams was added 5 parts by weight of deactivated organoclay-based rheology controller Garamite® 1958, containing <0.5 wt. % of water. The mixture was mixed again to form either an one-component adhesive composition according to present invention or component A) of a two-component adhesive composition according to the present invention.

Example 3

Organoclay-Based Rheology Controller with Catalyst

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total of 4.2 grams) and an organic tin-based catalyst (Neostann® 51 of Nitto Kasei Co.) (0.5 gram). To this mixture having a total weight of 100.5 grams was added 5 parts by weight of organoclay-based rheology controller Garamite® 1958, containing 4-6 wt. % of water. The mixture was mixed again to form either an one-component adhesive composition according to present invention or component A) of a two-component adhesive composition according to the present invention.

Example 4

Deactivated Organoclay-Based Rheology Controller with Catalyst

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total of 4.2 grams) and an organic tin-based catalyst (Neostann® 51 of Nitto Kasei Co.) (0.5 gram). To this mixture having a total weight of 100.5 grams was added 5 parts by weight of deactivated organoclay-based rheology controller Garamite® 1958, containing <0.5 wt. % of water. The mixture was mixed again to form either an one-component adhesive composition according to present invention or component A) of a two-component adhesive composition according to the present invention.

Comparative Example 1A

No Organoclay-Based Rheology Controller—with Catalyst and Water

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total weight of 4.2 grams) and an organic tin-based catalyst (Neostann® S1 of Nitto Kasei Co.) (0.5 gram). To this mixture having a total weight of 100.5 grams was added 0.25 parts by weight of water and mixed thoroughly. This leads to a water content of approx. 0.25% by weight of the total composition of A).

Comparative Example 1B

No Organoclay-Based Rheology Controller—with Catalyst and Water

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total weight of 4.2 grams) and an organic tin-based catalyst (Neostann® S1 of Nitto Kasei Co.) (0.5 gram). To this mixture having a total weight of 100.5 grams was added 0.5 parts by weight of water and mixed thoroughly. This leads to a water content of approx. 0.5% by weight of the total composition of A).

Example 5A

Combination of Example 4 and Component B

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total of 4.2 grams) and an organic tin-based catalyst (Neostann® S1 of Nitto Kasei Co.) (0.5 gram). To this mixture having a total weight of 100.5 grams was added 5 parts by weight of deactivated organoclay-based rheology controller Garamite® 1958, containing <0.5 wt. % of water. The mixture was mixed again to form component A) of a two-component adhesive composition according to the present invention. The resulting component A) was mixed with 2.5 grams of component B).

This results in a ratio of 30 parts of component A) (having a specific gravity of 1.49 g/ml) to 1 part of component B) (having a specific gravity of 1.08 g/ml).

The water content of the component B) used is approx. 21% by weight. This provides a water content of 0.5 parts by weight. Leading to approx. 0.5% by weight of water based on the total composition of A).

Example 5B

Combination of Example 4 and Water

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total of 4.2 grams) and an organic tin-based catalyst (Neostann® 51 of Nitto Kasei Co.) (0.5 gram). To this mixture having a total weight of 100.5 grams was added 5 parts by weight of deactivated organoclay-based rheology controller Garamite® 1958, containing <0.5 wt. % of water. The mixture was mixed again to form component A) of a two-component adhesive composition according to the present invention. The resulting component A) was mixed with 0.5 grams of water. This provides 0.5 parts by weight of water leading to a water content of approx. 0.5% by weight of the total composition of A).

Comparative Example 2

No Organoclay-Based Theology Controller—with Catalyst and Component B

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total of 4.2 grams) and an organic tin-based catalyst (Neostann® S1 of Nitto Kasei Co.) (0.5 gram). The mixture forms component A) of a two-component adhesive composition according to the present invention. The resulting component A) was mixed with 2.4 grams of component B).

This results in a ratio of 30 parts of component A) (having a specific gravity of 1.49 g/ml) to 1 part of component B) (having a specific gravity of 1.08 g/ml).

The water content of the component B) used is approx. 21% by weight. This provides a water content of 0.5 parts by weight. Leading to approx. 0.5% by weight of water based on the total composition of A).

Comparative Example 3

No Organoclay-Based Theology Controller—with Catalyst

A composition was prepared by mixing MS-Polymer® S303H of Kaneka (41 grams), precipitated calcium carbonate (PCC-) filler (52 grams), pigments (titanium dioxide) (2 grams), stabilizers (1:1 mixture of Tinuvin® 770 and Tinuvin® 328 of BASF—previously Ciba) (0.8 gram), functional silanes, namely 2.8 grams of a VTMO-silane (Vinyl TriMethOxy silane) and 1.4 grams of a AMMO-silane (3-AMinopropyltriMethOxy silane) (total weight of 4.2 grams) and an organic tin-based catalyst (Neostann® S1 of Nitto Kasei Co.) (0.5 gram).

For these Examples and Comparative Examples rheology measurements were carried out as described above (see section "Method of measuring rheology characteristics") at shear rates of 0.1 sec$^{-1}$, 1.0 sec$^{-1}$, and 5.0 sec$^{-1}$. Moreover, the early strength was measured as disclosed above (see section "Method of measuring early strength") with a pulling force of 600 mm/minute.

The results are provided in the Table below.

For the viscosity it is preferred that this is higher than normal after adding component B) or water. With normal is meant an adhesive composition without an organoclay-rheology controller. In the present invention Comparative Example 3 is used as the "normal".

TABLE

| Examples: | Flowcurves: viscosities (Pa · s) Shear rate γ (sec$^{-1}$) | | | Early strength Pulling rate: 600 mm/min |
|---|---|---|---|---|
| | 0.1 | 1.0 | 5.0 | N/2000 mm$^2$ |
| Example 1 | 40,520 | 6,819 | 1,725 | 58 |
| Example 2 | 22,900 | 3,758 | 1,045 | 38 |
| Example 3 | 84,180 | 12,270 | 2,640 | 69 |

TABLE-continued

| Examples: | Flowcurves: viscosities (Pa · s) Shear rate γ (sec$^{-1}$) | | | Early strength Pulling rate: 600 mm/min |
|---|---|---|---|---|
| | 0.1 | 1.0 | 5.0 | N/2000 mm$^2$ |
| Example 4 | 31,430 | 4,213 | 1,009 | 42 |
| Com. Exam. 1A | 35,360 | 7,723 | 1,755 | 54 |
| Com. Exam. 1B | 49,720 | 8,015 | 1,717 | 59 |
| Example 5A | 99,230 | 18,820 | 5,367 | 109 |
| Example 5B | 102,500 | 20,990 | 4,770 | 114 |
| Com. Exam. 2 | 36,810 | 7,561 | 1,738 | 59 |
| Com. Exam. 3 | 12,860 | 1,292 | 612 | 14 |

From the results of all the experiments carried out by the present inventors and as disclosed above in the Table, the following can be deduced.

The addition of a rheology controller to either a component A) of a two component adhesive or an one component adhesive will lead to an increase of viscosity. This is further elucidated from the Table above, especially from Comparative Example 3 and Examples 3 and 4.

In Comparative Example 3 no rheology controller was used. The viscosity at a shear rate of 0.1 sec$^{-1}$ was found to be 12,860 Pa·s. The viscosity at a shear rate of 1.0 sec$^{-1}$ was found to be 1,292 Pa·s. The viscosity at a shear rate of 5.0 sec$^{-1}$ was found to be 612 Pa·s. This is taken as the standard or normal in the calculations below, in other words as being 100%.

As cited above, it is very important for an one component or a two component adhesive to have a high viscosity directly after application. It is also cited above that preferably the viscosity in the container is much lower to allow ease of application from the container and/or mixing with component B. For the latter (ease of application) in particular a low viscosity at a shear rate of 5.0 sec$^{-1}$ is relevant.

Example 3 differs from Comparative Example 3 only in the fact that a non-deactivated rheology controller (Garamite® 1958) was added. The viscosity at a shear rate of 0.1 sec$^{-1}$ was found to be 84,180 Pa·s. The viscosity at a shear rate of 1.0 sec$^{-1}$ was found to be 12,270 Pa·s. The viscosity at a shear rate of 5.0 sec$^{-1}$ was found to be 2,640 Pa·s.

From the equation below the effect of the addition of non-deactivated rheology controller (in casu Garamite® 1958) on the viscosity can be calculated.

$$\left(\frac{\text{Ex. 3} - \text{Comp. Ex. 3}}{\text{Comp. Ex. 3}}\right) \times 100\%$$

Thus, the addition of a non-deactivated (i.e. active) rheology controller has the effect of increasing the viscosity at a shear rate of 0.1 sec$^{-1}$ with 555%; at a shear rate of 1.0 sec$^{-1}$ with 850%; and at a shear rate of 5.0 sec$^{-1}$ with 331%.

Example 4 differs from Comparative Example 3 only in the fact that a deactivated rheology controller (dried Garamite® 1958) was added. The viscosity at a shear rate of 0.1 sec$^{-1}$ was found to be 31,430 Pa·s. The viscosity at a shear rate of 1.0 sec$^{-1}$ was found to be 4,213 Pa·s. The viscosity at a shear rate of 5.0 sec$^{1}$ was found to be 1,009 Pa·s.

$$\left(\frac{\text{Ex. 4} - \text{Comp. Ex. 3}}{\text{Comp. Ex. 3}}\right) \times 100\%$$

Thus, the addition of a deactivated (i.e. less or not active) rheology controller has the effect of increasing the viscosity at a shear rate of 0.1 sec$^{-1}$ with 144%; at a shear rate of 1.0 sec$^{-1}$ with 226%; and at a shear rate of 5.0 sec$^{-1}$ with 65%.

In other words, the effect of the viscosity increase brought about by the addition of a rheology controller can be kept to a minimum by deactivation the rheology controller prior to the addition thereof.

The increase in viscosity at a shear rate of 0.1 sec$^{-1}$ is 555% without prior deactivation of the rheology controller and only 144% with prior deactivation of the rheology controller. The same trends can be observed for the other shear rates tested; 850% without and 226% with prior deactivation of the rheology controller at a shear rate of 1.0 sec$^{-1}$; 331% without and 65% with prior deactivation of the rheology controller at a shear rate of 5.0 sec$^{-1}$ This effect of the deactivation of the rheology controller is also visible without the presence of a catalyst in the mixture. This is visible from the differences between Example 1 and Example 2.

In Example 1 a non-deactivated rheology controller (Garamite® 1958) was used without the presence of a catalyst. The viscosity at a shear rate of 0.1 sec$^{-1}$ was found to be 40,520 Pa·s. The viscosity at a shear rate of 1.0 sec$^{-1}$ was found to be 6,819 Pa·s. The viscosity at a shear rate of 5.0 sec$^{-1}$ was found to be 1,725 Pa·s.

In Example 2 a deactivated rheology controller (dried Garamite® 1958) was used without the presence of a catalyst. The viscosity at a shear rate of 0.1 sec$^{-1}$ was found to be 22,900 Pa·s. The viscosity at a shear rate of 1.0 sec$^{-1}$ was found to be 3,758 Pa·s. The viscosity at a shear rate of 5.0 sec$^{-1}$ was found to be 1,045 Pa·s.

The following equation provides the percentage value for the decrease in viscosity that is observed when deactivated instead of active rheology controller is used.

$$\left(\frac{\text{Ex. 1} - \text{Ex. 2}}{\text{Ex. 1}}\right) \times 100\%$$

Upon deactivating the rheology controller the viscosity at a shear rate of 0.1 sec$^{-1}$ decreases from 40,520 Pa·s to 22,900 Pa·s. This is a decrease of 43%. A similar trend can be observed for the viscosities at the other shear rates: a decrease of 45% at a shear rate of 0.1 sec$^{-1}$ and a decrease of 39% at a shear rate of 5.0 sec$^{-1}$ Concluding, it can be remarked that the addition of a rheology controller to either a component A) of a two component adhesive or an one component adhesive will always lead to an increase of viscosity. However, this increase can be limited by the prior deactivation of the rheology controller with or without the presence of a catalyst in the composition.

The addition of a catalyst to the adhesive composition also has an effect on the viscosity. This can be deduced from comparison of Examples 4 and 2 and Examples 3 and 1.

Example 3 differs from Example 1 only by the addition of a catalyst (non-deactivated rheology controller). The same applies for Example 4 when compared to Example 2 (deactivated rheology controller). The two equations below provide the percentage values for the increase in viscosity caused by the addition of a catalyst.

$$\left(\frac{\text{Ex. 3} - \text{Ex. 1}}{\text{Ex. 1}}\right) \times 100\%$$

$$\left(\frac{\text{Ex. 4} - \text{Ex. 2}}{\text{Ex. 2}}\right) \times 100\%$$

For the non-deactivated rheology controller: increases are observed in the viscosity upon addition of a catalyst of 108% (0.1 sec$^{-1}$), 80% (1.0 sec$^{-1}$), 53% (5.0 sec$^{-1}$).

For the deactivated rheology controller: increases are observed in the viscosity upon addition of a catalyst of 37% (0.1 sec$^{-1}$), 12% (1.0 sec$^{-1}$), no significant change (5.0 sec$^{-1}$). It is clear that the larger effect is obtained for lower shear rates.

The reason for this (although the inventor does not want to be bound to a particular theory) is believed to be related to the presence of a small amount of water still present in the deactivated rheology controller. This water in combination with the catalyst will have an effect that might lead to form temporary bonds (a thixotropic effect) which increase the viscosity; at higher shear these temporary bonds might be broken.

In addition, the larger effect is obtained in case a non-deactivated rheology controller is present. The reason for this (although the inventor does not want to be bound to a particular theory) is believed to be related to the presence of a significant amount of water (approx. 4-6% of the rheology controller) which will have a viscosity increasing effect in combination with the catalyst.

Several observations can be derived from the examples above with respect to the effect of the addition of moisture or water; in the form or either water or component B.

First, the effect of the addition of moisture to the moisture-curing polymer (with catalyst) will be discussed without the presence of any rheology controller. This is further elucidated from the Comparative Examples.

Comparative Example 3 has no added water.
Comparative Example 1B has 0.5 parts by weight of water added.
Comparative Example 2 has component B added in such an amount that it provides 0.5 parts by weight of water.
Comparative Example 1A has 0.25 parts by weight of water added.

The equation below shows the effect of the addition of 0.5 parts by weight of water.

$$\left(\frac{\text{Comp. 1}B - \text{Comp. Ex. 3}}{\text{Comp. Ex. 3}}\right) \times 100\%$$

Upon addition of 0.5 parts by weight of water the viscosity increases with 287% (shear rate of 0.1 sec$^{-1}$), 520% (shear rate of 1.0 sec$^{-1}$), 181% (shear rate of 5.0 sec$^{-1}$).

The equation below shows the effect of the addition of component B to provide 0.5 parts by weight of water.

$$\left(\frac{\text{Comp. Ex. 2} - \text{Comp. Ex. 3}}{\text{Comp. Ex. 3}}\right) \times 100\%$$

Upon addition of component B to provide 0.5 parts by weight of water the viscosity increases with 186% (shear rate of 0.1 sec$^{-1}$), 485% (shear rate of 1.0 sec$^{-1}$), 184% (shear rate of 5.0 sec$^{-1}$).

From the above two paragraphs it can be deduced that there is no significant difference in the effect of water added in the form of water or component B.

In other words, the water present in component B is readily available for reaction with the polymer. From the above it could be deduced (although the present inventors do not want to be bound to a particular theory) that in principle only the water of component B, and not the other constituents have an effect on the increase of the viscosity.

The equation below shows the effect of the addition of 0.25 parts by weight of water.

$$\left(\frac{\text{Comp. Ex. } 1A - \text{Comp. Ex. } 3}{\text{Comp. Ex. } 3}\right) \times 100\%$$

Upon addition of 0.25 parts by weight of water the viscosity increases with 175% (shear rate of 0.1 sec$^{-1}$), 498% (shear rate of 1.0 sec$^{-1}$), 187% (shear rate of 5.0 sec$^{-1}$).

In the table below the viscosity increases in percentages are provide for the addition of 0.25 parts and 0.5 parts of water.

|  | 0.25 parts water | 0.5 parts water | 0.5 parts water by B) |
|---|---|---|---|
| Shear rate 0.1 sec$^{-1}$ | 175% | 287% | 186% |
| Shear rate 1.0 sec$^{-1}$ | 498% | 520% | 485% |
| Shear rate 5.0 sec$^{-1}$ | 187% | 181% | 184% |

The effect of water on the increase in viscosity does not increase linearly with an increasing amount of water. The effect of 0.5 parts by weight of water on the viscosity at a shear rate of 0.1 sec$^{-1}$ is larger than the effect of 0.25 parts by weight of water. However, the effect is not doubled. There is hardly any effect noticeable for the addition of 0.5 parts by weight of water compared to 0.25 parts by weight of water for higher shear rates. Perhaps this is due (although the inventors do not want to be bound to a particular theory) to the fact that at lower shear rates other thixotropic effects might play a role.

The effect of the addition of water or component B to the moisture-reactive polymer with the presence of the deactivated rheology controller has a large effect on the viscosity. This is the essence of the present invention.

Example 4 (deactivated rheology controller) has no added water. Example 5A (deactivated rheology controller) has component B added to provide 0.5 parts by weight of water. The difference between Example 5A and Example 4 provide the net viscosity effect provided by the water in component B).

Moreover, the difference between Comparative Example 2 and Comparative Example 3 provide information about the net viscosity effect of water from the component B) when no rheology controller is present.

In other words, when the data from Example 4, 5A, Comparative Example 2 and 3 are combined the net effect of the addition of deactivated rheology controller can be deduced.

When the difference between the above is calculated by the equation below:

$$\left(\frac{(\text{Ex. } 5A - \text{Ex. } 4) - (\text{Comp. Ex. } 2 - \text{Comp. Ex. } 3)}{(\text{Comp. Ex. } 2 - \text{Comp. Ex. } 3)}\right) \times 100\%$$

Will provide the following values:

at 0.1 sec$^{-1}$:(67,800−23,950)/23950×100%=+183% at 1.0 sec$^{-1}$:(14,607−6,269)/6269×100%=+133% at 5.0 sec$^{-1}$:(4,358−1,126)/1126×100%=+287%

With respect to the early strength it can be seen that in the Comparative Examples 1A, 1B and 2 (without rheology controller), upon the addition of water, the value is approximately 54-59 N/2000 mm$^2$.

However, upon addition of the rheology controller in the reactivated form this increases to values of 109 and 114 N/2000 mm$^2$ for Examples 5A and 5B when a deactivated rheology controller is added which has been reactivated by the addition of water or component B).

Thus the early strength is significantly improved by the addition of a deactivated organoclay-based rheology controller according to the present invention.

As shown in the Table, one or more aims of the present invention are obtained by the adhesive compositions as cited in the appended claims.

The invention claimed is:

1. An adhesive composition, usable for activation by moisture, said adhesive composition comprising a moisture cross-linking polymer selected from the group consisting of silyl modified polymers (SMP), and an inactivated organoclay-based rheology controller being an alkyl ammonium salt-modified mineral clay mixture, wherein said composition is a two-component adhesive composition, comprising a component A) comprising the moisture cross-linking polymer and the organoclay-based rheology controller; and a component B) comprising water, wherein component A has a dynamic viscosity of between 20,000 and 40,000 Pas as measured at 23° C. at a shear rate of 0.1 sec$^{-1}$ and/or a dynamic viscosity of between 800 and 1200 Pas as measured at 23° C. at a shear rate of 5.0 sec$^{-1}$.

2. The composition according to claim 1, wherein said adhesive composition comprises water in an amount that is equal to or less than 0.5 w/w.%, based on the weight of said adhesive composition.

3. The composition according to claim 1, wherein said rheology controller comprises water in an amount that is equal to or less than 0.5 w/w.%, based on the weight of said rheology controller.

4. The composition according to claim 1, wherein said rheology controller present in inactivated form, is able to be reactivated by ambient moisture or component B).

5. The composition according to claim 1, wherein the weight ratio of component A) to component B) is between 1:1 and 100:1.

6. A method of preparation of an adhesive composition according to claim 1 by combining two-components A) and B) of a two-component adhesive composition, wherein said moisture cross-linking polymer is cross-linked and/or cured by the addition of component B) to component A) and wherein said rheology controller present in component A) is reactivated by said component B).

7. The method according to claim 6, wherein the early strength of the adhesive composition upon mixing of components A) and B) immediately after the substrates to be joined have been fitted together, is between 80 and 120 N/2000 mm$^2$.

8. An adhesive composition according to claim 1, wherein the moisture cross-linking polymer is a silyl-terminated polymer.

9. The composition according to claim 1, wherein said adhesive composition comprises water in an amount that is equal to or less than 0.3 w/w.%, based on the weight of said adhesive composition.

10. The composition according to claim 1, wherein said adhesive composition comprises water in an amount that is equal to or less than 0.1 w/w.%, based on the weight of said adhesive composition.

11. The composition according to claim 1, wherein said rheology controller comprises water in an amount that is equal to or less than 0.3 w/w.%, based on the weight of said rheology controller.

12. The composition according to claim 1, wherein said rheology controller comprises water in an amount that is equal to or less than 0.1 w/w.%, based on the weight of said rheology controller.

13. The composition according to claim 1, wherein the weight ratio of component A) to component B) is between 10:1 to 60:1.

14. The composition according to claim 1, wherein the weight ratio of component A) to component B) is between 30:1 to 50:1.

15. A kit of parts comprising two containers, wherein said two containers each contain a component of a two-component adhesive composition: a first container comprising component A) based on a moisture cross-linking polymer that is a silyl-modified polymer and comprising an organo-clay-based rheology controller; and a second container comprising component B) comprising water, the said kit optionally further comprising compression means and optionally also a static mixing head, wherein said mixing head is capable of receiving component A from the first container and component B from the second container simultaneously, and wherein component A has a dynamic viscosity of between 20,000 and 40,000 Pas as measured at 23° C. at a shear rate of 0.1 sec$^{-1}$ and/or a dynamic viscosity of between 800 and 1200 Pas as measured at 23° C. at a shear rate of 5.0 sec$^{-1}$.

16. A one-component dual action adhesive composition based on a moisture cross-linking polymer that is a silyl-modified polymer and further comprising a organoclay-based rheology controller; and composition showing dual action upon contact with moisture, being physical action by means of reactivation of said rheology controller after inactivation and chemical action by cross-linking and/or curing of said moisture cross-linking polymer, said adhesive composition having a dynamic viscosity of between 20,000 and 40,000 Pas as measured at 23° C. at a shear rate of 0.1 sec$^{-1}$ and/or a dynamic viscosity of between 800 and 1200 Pas as measured at 23° C. at a shear rate of 5.0 sec$^{-1}$.

17. A two-component dual action adhesive composition based on two separate components A) and B), component A) being based on a moisture cross-linking polymer that is a silyl-modified polymer and further comprising a organoclay-based rheology controller; and component B) comprising water; said first component A) showing dual action upon addition of component B), the dual action being physical action by means of reactivation of said rheology controller after inactivation and chemical action by cross-linking and/or curing of said moisture cross-linking polymer, component A having a dynamic viscosity of between 20,000 and 40,000 Pas as measured at 23° C. at a shear rate of 0.1 sec$^{-1}$ and/or a dynamic viscosity of between 800 and 1200 Pas as measured at 23° C. at a shear rate of 5.0 sec$^{-1}$.

* * * * *